(12) United States Patent
Chandler (10) Patent No.: US 9,015,249 B2
(45) Date of Patent: Apr. 21, 2015

(54) SYSTEM AND METHOD FOR ASSOCIATING AUDIO DATA WITH IMAGE FILE DATA

(71) Applicant: Seemail, LLC, Phoenix, AZ (US)

(72) Inventor: Ward A. Chandler, Phoenix, AZ (US)

( * ) Notice: Subject to any disclaimer, the term of this patent is extended or adjusted under 35 U.S.C. 154(b) by 272 days.

(21) Appl. No.: 13/839,116

(22) Filed: Mar. 15, 2013

(65) Prior Publication Data
US 2013/0262579 A1    Oct. 3, 2013

Related U.S. Application Data

(60) Provisional application No. 61/613,192, filed on Mar. 20, 2012.

(51) Int. Cl.
*G06F 15/16* (2006.01)
*H04L 29/08* (2006.01)
*G06Q 50/00* (2012.01)

(52) U.S. Cl.
CPC ............ *H04L 67/02* (2013.01); *G06Q 50/01* (2013.01); *H04L 67/06* (2013.01); *H04N 2201/3246* (2013.01); *H04N 2201/3247* (2013.01); *H04N 2201/3264* (2013.01); *H04N 2201/3205* (2013.01)

(58) Field of Classification Search
CPC .................................. G06Q 50/01; H04L 67/06
USPC .................................... 709/200–205, 217–227
See application file for complete search history.

(56) References Cited

U.S. PATENT DOCUMENTS

| | | | |
|---|---|---|---|
| 6,334,025 B1* | 12/2001 | Yamagami | 386/241 |
| 6,421,470 B1* | 7/2002 | Nozaki et al. | 382/321 |
| 7,617,107 B2* | 11/2009 | Nagai | 704/270 |
| 2004/0167783 A1* | 8/2004 | Nagai | 704/270 |
| 2012/0315013 A1* | 12/2012 | Wing et al. | 386/241 |
| 2013/0036169 A1* | 2/2013 | Quigley et al. | 709/204 |
| 2014/0040244 A1* | 2/2014 | Rubinstein et al. | 707/722 |

* cited by examiner

*Primary Examiner* — Moustafa M Meky
(74) *Attorney, Agent, or Firm* — The Noblitt Group, PLLC (57) ABSTRACT

Methods and apparatus for associating audio file data with image file data according to various aspects of the present invention comprise a social object creation module that is configured to combine multiple files type into a single social media object that may be shared by users. The social object creation module may be installed on a computing device to enable the computing device to create the social object by combining a digital image with an audio file into a single object or data package that may be communicated to another computing device over a communication network.

26 Claims, 3 Drawing Sheets

SYSTEM AND METHOD FOR ASSOCIATING AUDIO DATA WITH IMAGE FILE DATA

CROSS-REFERENCES TO RELATED APPLICATIONS

This application claims the benefit of U.S. Provisional Patent Application No. 61/613,192, filed Mar. 20, 2012, and incorporates the disclosure of the application by reference.

BACKGROUND OF INVENTION

Social networks allow users to interact with each other in various ways to share information regarding interests and activities across political, economic, and geographic borders. This interaction takes place over a public network such as the internet. Popular social networks allow users to exchange personal information with selected users, provide direct methods of communication such as instant messaging and email. Social networks may utilize a website to attract users and provide a central theme or concept.

For example, some social networks may comprise a website directed towards allowing users to share digital images. The digital images may be grouped according to interest, topic, user name, style, or any other suitable criteria. Users may then upload images to the website, view images uploaded by others, and provide text based comments relating to a given image. Other social networks may not be solely focused on a single theme but still allow users to upload digital images and video wherein users may be able to provide text based comments.

A common feature among the various social networks and other electronic methods of communication is that users are limited to providing comments in text format. Likewise, users who upload images to a social network or otherwise communicate images to others over email are only given the option of including text based descriptions to describe the image.

SUMMARY OF THE INVENTION

Methods and apparatus for associating audio file data with image file data according to various aspects of the present invention comprise a social object creation module that is configured to combine multiple files type into a single social media object that may be shared by users. The social object creation module may be installed on a computing device to enable the computing device to create the social object by combining a digital image with an audio file into a single object or data package that may be communicated to another computing device over a communication network.

BRIEF DESCRIPTION OF THE DRAWINGS

A more complete understanding of the present invention may be derived by referring to the detailed description when considered in connection with the following illustrative figures. In the following figures, like reference numbers refer to similar elements and steps throughout the figures.

DETAILED DESCRIPTION OF EXEMPLARY EMBODIMENTS

The present invention may be described in terms of functional block components and various processing steps. Such functional blocks may be realized by any number of components configured to perform the specified functions and achieve the various results. For example, the present invention may employ various types of mobile devices, wireless devices, user interfaces, communication systems and the like, which may carry out a variety of functions. In addition, the present invention may be practiced in conjunction with any number of processes such as wireless communication, communication over the internet, and data transfer, and the system described is merely one exemplary application for the invention. Further, the present invention may employ any number of conventional techniques for saving data files, integrating multiple types of data, communicating between devices and remote servers, displaying images, and/or playing audio.

Methods and apparatus for associating audio file data with image file data according to various aspects of the present invention may operate in conjunction with any suitable data recording device and/or system. Various representative implementations of the present invention may be applied to any device capable of capturing images, recording and/or playing audio, and receiving text based input.

Figure 1:
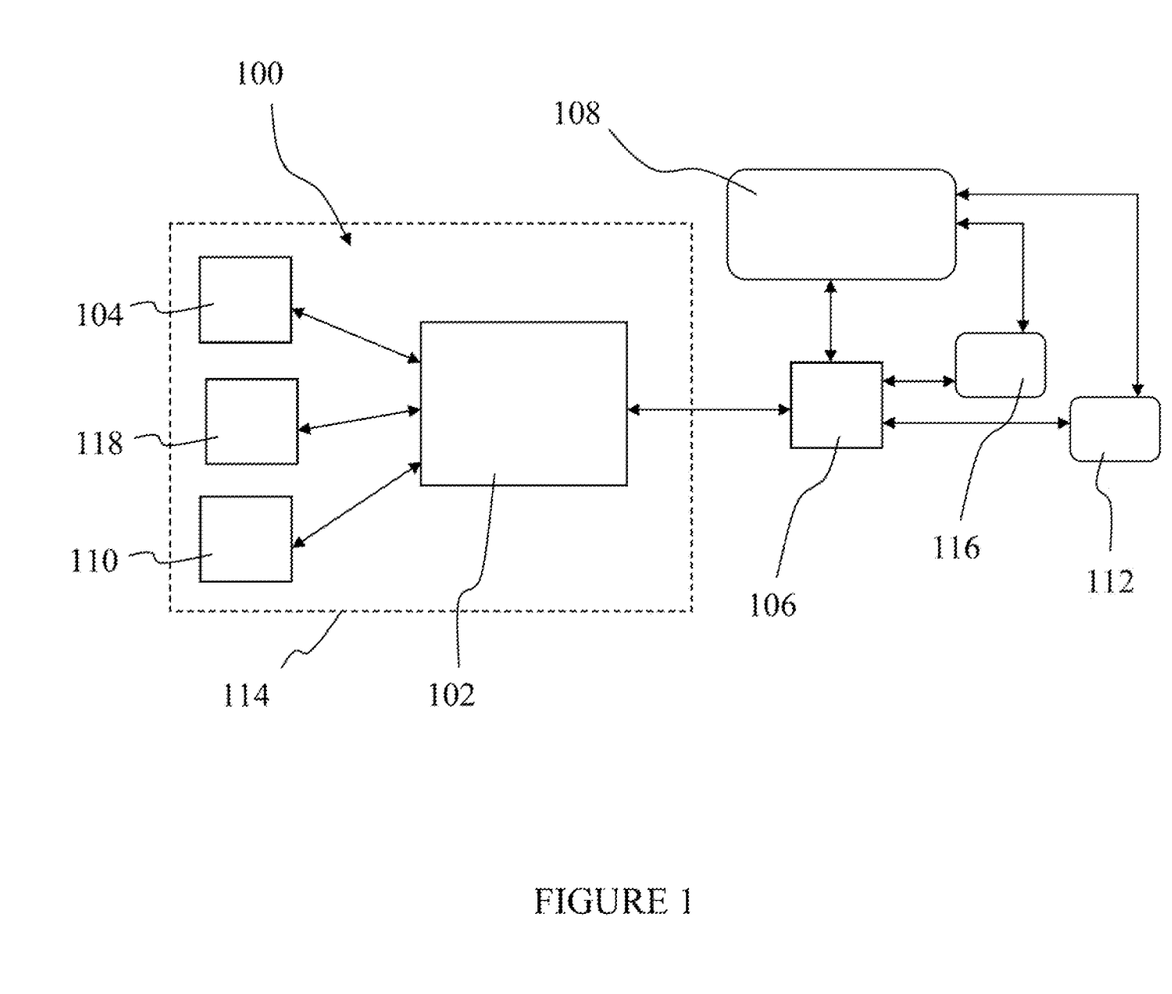
FIG. 1 representatively illustrates an interactive data association system in accordance with an exemplary embodiment of the present invention.

Referring now to FIG. 1, in an exemplary embodiment of the present invention an interactive data association system 100 may comprise social object creation module 102 adapted to combine image file data with audio file data to form a single social object comprising both image and audio file data and communicatively interface with one or more users over a communications network such as the internet. The social object creation module 102 may comprise any suitable device or system for receiving two or more separate data files and associating them together to create a social object such that they are presented to users in an integrated manner as a single object or data package. For example, the social object creation module 102 may comprise a system communicatively linked with a memory device 104 storing one or more digital images and a communication system 106 that allows the social object creation module 102 to connect to a remote application server 108 and/or a social media network 112. The social object creation, module 102 may further be communicatively linked with an image capturing device such as a digital camera 110 that is suitably adapted to generate a digital image file that may be saved under any suitable image format such as JPEG, GIF, TIFF, PNG, and the like and/or a audio recording device 118 suitably adapted to generate a digital audio file that may saved under any suitable audio format such as WAV, MP3, MP4, WMA, and the like.

The communication system 106 may comprise any suitable system configured to receive and transmit information across sources such as satellites, cellular towers, radio broadcasting stations, wireless hot spots, the internet, and the like. For example, the social object creation module 102 may be adapted to be installed or otherwise integrated into a computing device 114 capable of communicating with the application server 108, an application delivery system 116, or the social media network 112 by sending and receiving data via the communication system 106. For example, in one embodiment, the computing device 114 may comprise a mobile telephone, or "smartphone," adapted to operate on any wireless communication platform or communication service provider. Alternatively, the computing device 114 may comprise a personal computing device such as a laptop computer, a tablet computer, a desktop computer, or any like device capable of communicating over the communication system 106.

The application server 108 communicates with the social object creation module 102 to facilitate distribution of the created social object. The application server 108 may comprise any suitable device or system for communicating with the social object creation module 102, storing data files and/or application programs, and facilitating the transfer of the social objects between multiple users. For example, in one embodiment, the application server 108 may comprise a network based computer system configured to manage a social interaction between multiple users sharing created social objects.

The application server 108 may also be configured to provide an application program to the application delivery system 116 for distribution to users via the computing device 114. The application program may comprise a set of computer implemented instructions for causing the social object creation module 102 to be installed on the computing device 114 to enable the computing device to create the social object and communicate with the application server 108.

The application server 108 may also be configured to store social objects and allow control access to stored social objects. The application server 108 may also be configured to present the social objects to users in a format consistent with other communication services such as an email server. For example, the application server 108 may be configured to receive a social object from a first user with an indication that it should be delivered to a second user. The application server 108 may then send a message to the second user via the social object creation module 102 to indicate that a social object is stored on the application server 108 and is awaiting transfer to the second user. The second user may then choose to open the social object causing the application server 108 to transfer the social object to the second user's computing device.

The application delivery system 116 provides a delivery mechanism for installing an application program on the computing device 114. The application delivery system 116 may comprise any suitable system or method for allowing the computing device 114 to install application programs. In one embodiment, the application delivery system 116 may comprise a virtual storefront adapted to allow users to select a desired application program for use on their respective computing devices. For example, the user may be able to access the virtual storefront through the internet by using the computing device 114 to connect to the application delivery system 116 via the communication system 106. The user may then select an application program and have the selected application program delivered to the computing device over the communication system 106.

The social media network 112 provides a conduit for multiple users to interact with each other through a network such as the internet to create, share, and exchange information. The social media network 112 may comprise any suitable method or system allowing multiple users to interact. The social media network 112 may comprise a public or private network utilizing web based and mobile technologies to facilitate information exchange between users. For example, the social object creation module 102 may allow the computing device 114 to send and/or receive information from the social media network 112. In one embodiment, the application server 108 may be integrated into a first social media site and be suitably configured to communicate information received from the computing device 114 to a second social media site and/or communicate information from a the second social media site to the computing device 114. In alternative embodiment, the computing device 114 may be configured to send or receive information directly with the second social media site.

The memory device 104 stores information that is either received or created by the computing device 114, the digital camera 110, the audio recording device 118, the application server 108, and/or the social media network 112. The memory device 104 may comprise any suitable memory system such as a hard disc drive, flash memory, removable media card, or some combination of multiple types of memory. The memory device 104 may be configured to either permanently or temporarily store data in response to a command from the computing device 114. The memory device 104 may also be accessed by any suitable external sources such as through a USB connection to the computing device 114. Alternatively, the computing device 114 may be configured to transmit data from the memory device 104 through a wireless signal and/or upload saved data through an internet connection to the application server 108.

The social object creation module 102 enables the computing device 114 to combine different file types to form the social object. The social object creation module 102 may comprise any system or device adapted to create the social object from multiple data types that may be transferred to the application server 108, another computing device 114, and/or the social media network 112. In one embodiment, the social object creation module 102 may comprise a set of computer readable instructions for causing the computing device 114 to respond to various user inputs to create the social object. For example, the social object creation module 102 may comprise an application system adapted for installation on multiple computing devices 114. The social object creation module 102 may further enable the computing device 114 to communicate with the application server 108 either directly or through the social media network 112 to send and/or retrieve the social object.

The social object creation module 102 may be suitably configured to display a graphical user interface (GUI) on the computing device 114 that is adapted to guide the user through a social object creation process. In response to a command to create the social object, the GUI may prompt the user to select a saved digital image file from the memory device 104, create a new image file with the digital camera 110, or select an image from the application server 108 or the social media network 112. In one embodiment, if an image is selected from the memory device 104, the social object creation module 102 may create a copy of the image to be used as part of the social object. Once an image is selected or otherwise made available to the social object creation module 102, the social object creation module 102 may initiate a process of creating a series of associations linked to the saved digital image file. For example, social object creation module 102 may be suitably configured to allow the user to create an audio recording and/or provide a description of the image such as to indicate where or when the image was taken, what is shown in the image, or record the auditory environment where the image was captured.

The social object creation module 102 may respond to an input from the user to create a new audio file or select an existing audio file from the memory device 104 to be linked to the selected image. The social object creation module 102 may then present a series of steps to the user to facilitate the creation of the audio file or allow the user to select the audio file from the memory device 104. Alternatively, the social object creation module 102 may be suitably configured to initiate the social object creation process by prompting the user to first create a new audio file or select an audio file from the memory device 104 prior to creating or selecting an image file.

In one embodiment, the social object creation module 102 may be configured to access the recording device 118 of the computing device 114 so that the user may record the audio file. The social object creation module 102 may then store, at least temporarily, the audio file on the memory device 104. The social object creation module 102 may then present the user with one or more options relating to the created audio file. For example, the social object creation module 102 may prompt the user to listen to the audio file, save the audio file, delete the audio file, or replace the audio file with an alternate recording.

After the social object creation module 102 receives an input from the user indicating that the audio file and digital image should be saved or otherwise associated together, the social object creation module 102 may combine the two separate files into a single social object that can be saved to the memory device 104, transferred to the application server 108, transferred to another computing device directly over the communication system 106, and/or otherwise communicated to others via the social media network 112.

The created social object may comprise a permanent association between the digital image and the audio description. For example, the social object may comprise the digital image file and the audio file embedded together as a single file so that the social object may be transmitted over the communication system 106 and saved on the application server 108, another computing device 114, or the social media network 112 in a more efficient manner. If the social object is saved to the application server 108, the social object may be assigned a URL identifier so that the social object may be retrieved. In another embodiment, the social object creation module 102 may store the digital image file and the audio file as compressed files within a single file folder forming the social object that may then be transmitted to the application server 108 or the social media network 112. In a third embodiment, the social object creation module 102 create a file that contains data pertaining to the storage location of the digital image and the audio file such that when the social object is transferred to the application server 108 a copy of each file is transferred simultaneous with the social object.

In another embodiment, the social object creation module 102 may be configured to include a security feature to protect the social object from undesired access by saving the social object as a unique format or file type that may only be accessed by the social object creation module 102 or the application server 108. Alternatively, the social object may comprise an encryption code protecting any underlying data from being accessible or interpreted by a computing device 114 not having an installed social object creation module 102.

The social object creation module 102 may further be configured to create additional associations to the social object. For example, the user may be provided the option to create a text based caption that may be combined with the digital image and the audio file to form the social object. The text based caption may then be displayed with the digital image when the social object is accessed. In another embodiment, the user may be able to associate additional information with the image such as geographic location information, time, date, and a list of recipients that may be able to access the social object.

The social object creation module 102 may further be configured to allow the user to include additional elements into the social object directed towards providing some control over how the social object is viewed or heard. For example, the social object creation module 102 may respond to an input from the user comprising a command to include one or more filters with the social object. The filters may correspond to a visual appearance of the digital image or a sound associated with the audio file. For example, the social object may include a filter associated with the image allowing users to adjust a look and feel of the digital image such by altering the displayed colors, adjusting the contrast, or the like. Alternatively, the social object may include an audio filter associated with the audio file allowing users to alter a tone or pitch or speed of the audio file when replayed.

The social object creation module 102 may also be configured to allow the user to control access to the social object by presenting an option or responding to command on the GUI to include a password. For example, if a password is included within the associations of the social object, then the information making up the social object may only be accessed in response to the entry of the correct password. In another embodiment, the social object may include an association indicating that the social object may only be accessible for a predetermined amount of time. For example, the user may indicate that the social object may include a duration in which the social object may be accessed by other users after the social object has been communicated to the application server 108 and/or the social network 112.

Alternatively, social object creation module 102 may allow the user to limit access to the social object by indicating that the social object should be deleted after being retrieved from the application server 108 and viewed by a second user. For example, after the social object is viewed by the second user, the object will be deleted from both the application server 108 and the second user's computing device 114. Upon deletion, the social object will no longer be viewable or accessible by the second user.

Once the social object is communicated to the application server 108 and/or the social network 112, other users may access the social object and be allowed to view the image, listen to the audio description, and/or access one or more of the additional associations such as the textual message. In one embodiment, the application server 108 may be responsive to multiple users and saved uploaded social objects within a database comprising a profile for each user. The user may be able to search the database for social objects or retrieve a social object by responding to a message indicating that a social object has been uploaded to the application server 108 and included the user as a recipient. For example, the user may be able to click on a link in the message corresponding to the URL location for the social object. Clicking on the link may initiate a process that communicates, downloads, or otherwise transfers the social object from the application server 108 to the user's computing device.

Similarly, the computing device 114 or the application server 108 may be configured to upload the social object to the social media network 112 where other users may have at least limited access to the social object. For example, a social media network 112 that is not directly related to the interactive data association system 100 may only be allowed access the image and audio portions of the social media object. A user may be directed to the application server 108 if they want to access all of the associations in the social object.

Upon accessing a social object, the social object creation module 102 may also be configured to present the audio and/or textual message to a user by any suitable method. For example, if the social object includes a digital image, an audio file, and a text file, the social object creation module 102 may display to the user an option to choose whether to listen to the audio message or view the textual message. Alternatively, the social object creation module 102 may present the social object in such a way that the image is displayed to the user and is responsive to an input comprising a command to play the audio file while the image is displayed. For example, the GUI may display an object on a screen of the computing device 114 that is responsive to a touch command which causes the computing device to play the audio file. Similarly, the GUI may comprise a second object that is responsive to a touch command and allows the user to view the text file or access additional associations making up the social object.

The social object creation module 102 may also be configured to receive an input from a user viewing a social object comprising information relating to the social object. For example, the social object creation module 102 may be configured to allow the user to create a text based or audio based comment that is saved as part of the social object. Accordingly, if a social object containing a text comment is then forwarded to other users the comment will be displayed in connection with the social object to thereby allow continued social interaction between multiple users.

In operation, the social object creation module 102 may be installed on a portable or nonportable computing device 114 such as a smartphone, a tablet computer, a laptop computer, a desktop computer, and the like. In one embodiment, the computing device 114 may have an integrated memory device 104, image capturing device 110, and audio recording device 118. The computing device 114 may also be configured to communicate over the communication system 106. The social object creation module 102 may be configured to selectively access the memory device 104 to access stored digital images or audio files. Additionally, the social object creation module 102 may be configured to selectively access the image capturing device 110 or the audio recording device 118 to create a new digital image or audio recording.

Figure 2:
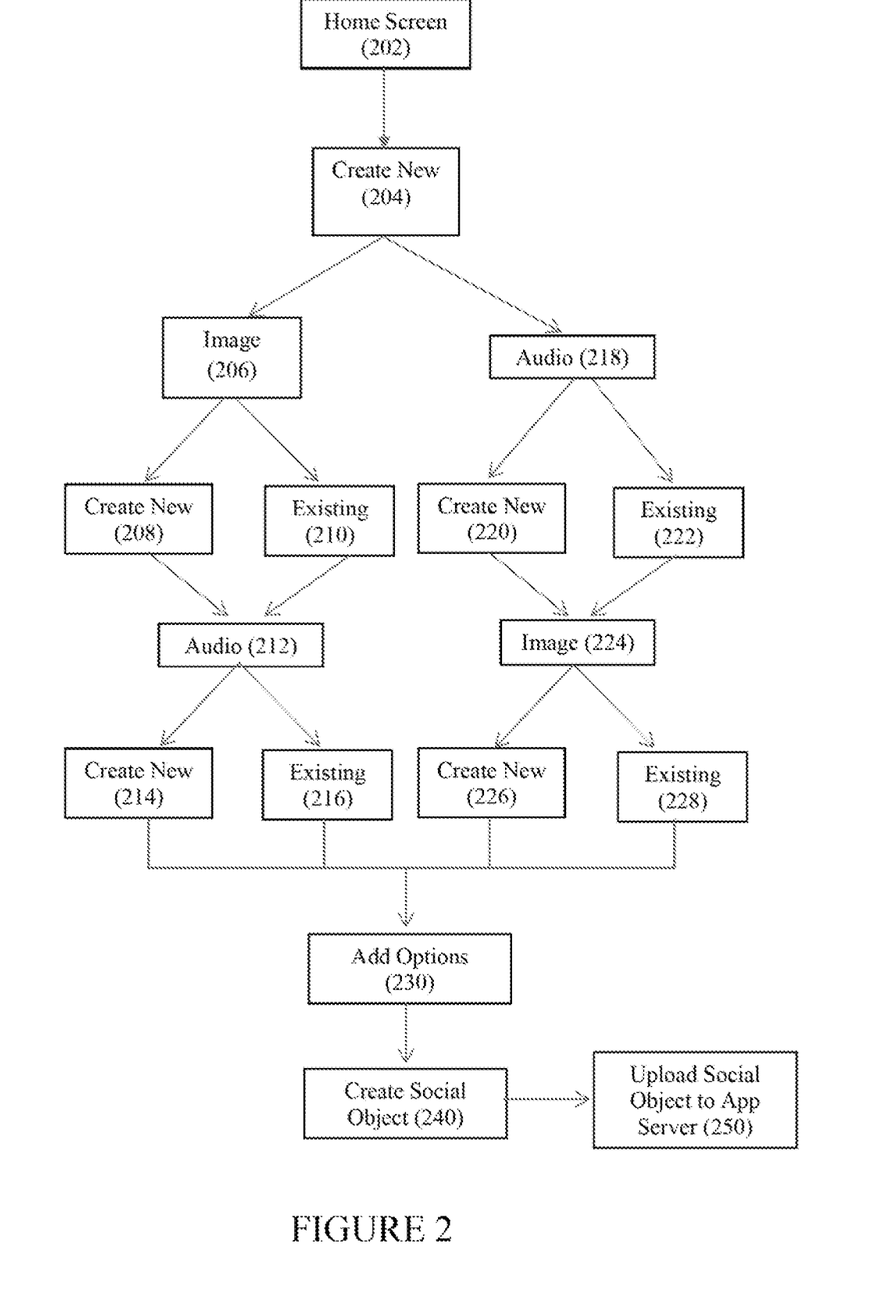
FIG. 2 representatively illustrates an operational flow chart for creating a social object in accordance with an exemplary embodiment of the present invention.

The social object creation module 102 may comprise a home screen displayed to the user over a display coupled to the computing device such as a monitor or screen when the social object creation module 102 is activated. The home screen may be adapted to allow the user to control the social object creation module 102 and selectively manage social objects. Referring now to FIG. 2, from the home screen, the user may be able to select an option to create a new social object (202). Upon receiving the input from the user, the home screen may change to present a screen or series of screens adapted to assist the user create the social object. For example, the social object creation module 102 may present a screen presenting the user with an option to initiate creation of the new social object from an image or from an audio file (204).

If the user selects the option to create the social object from an image (206), the social object creation module 102 may present a series of screens guiding the user through the creation process. For example, the social object creation module 102 may present the user with an option to create a new digital image (208) or to select an existing image from the memory device 104 or any other suitable source such as the application server 108 or the social media network 112 (210). After the digital image to be associated with the social object is chosen, the social object creation module 102 may prompt the user to include an audio file (212). The user may then be presented with an option to create a new audio file (214) or select an existing audio file from any suitable source such as the memory device 104, the application server 108 or the social media network 112 (216). In addition, the user may be presented with an option to listen to the audio file prior to confirming its inclusion into the social object.

Similarly, if the user selects the option to create the social object from an audio file (218), social object creation module 102 may present a different set of screens or options to guide the user through the creation process. For example, the user may be prompted to select whether to create the social object from a new audio file (220) or to select an existing audio file (222) from the memory device 104 or any other suitable source such as the application server 108 or the social media network 112. After the audio file to be associated with the social object is identified, the social object creation module 102 may prompt the user to select an image (224). The user may then create a new image with the image capturing device 110 (226) or select an existing image from any suitable source such as the memory device 104, the application server 108, or the social media network 112 (228).

The social object creation module 102 may then present the user with the option to include additional associations such as the text based caption, privacy instructions, or one or more other users to whom the social object should be communicated to (230). After the image and audio file have been selected and all options have been selected, the social object creation module 102 may create the social object (240) and at least temporarily save the social object on the memory device 104 of the computing device 114. For example, the social object may be saved on the computing device 114 as a draft if the user decides to complete the creation process at a later time. Alternatively, the social object may be saved on the computing device 114 as a draft if the computing device 114 isn't connected to the communication system 106 and is therefore unable to immediately communicate the social object to the application server 108 or another user. In another embodiment, the social object creation module 102 may be suitably configured to save a copy of every social object created by the user on the memory device 104.

Once the user is finished with the creation process, the social object may be transferred to the application server 108 (250). The social object creation module 102 may also be configured to present the user with an option to select the method in which the social object will be shared with the other users. For example, the social object creation module 102 may suggest one or more methods of notifying other users such as by email, over the social media network 112, or via the application server 108 that a new social object has been created and is available for download to the users' respective computing devices 114. In another embodiment, the social object creation module 102 may allow the user to share the social object directly to the computing device 114 of another user over any suitable method such as over the communication system 106, short wavelength radio transmission, and near field communication. In yet another embodiment, the social object creation module 102 may allow the user to select a timed released schedule for multiple social objects. For example, the user may create a series of social objects and then selectively choose to have the social object creation module 102 to share individual social objects at selected time intervals.

Figure 3:
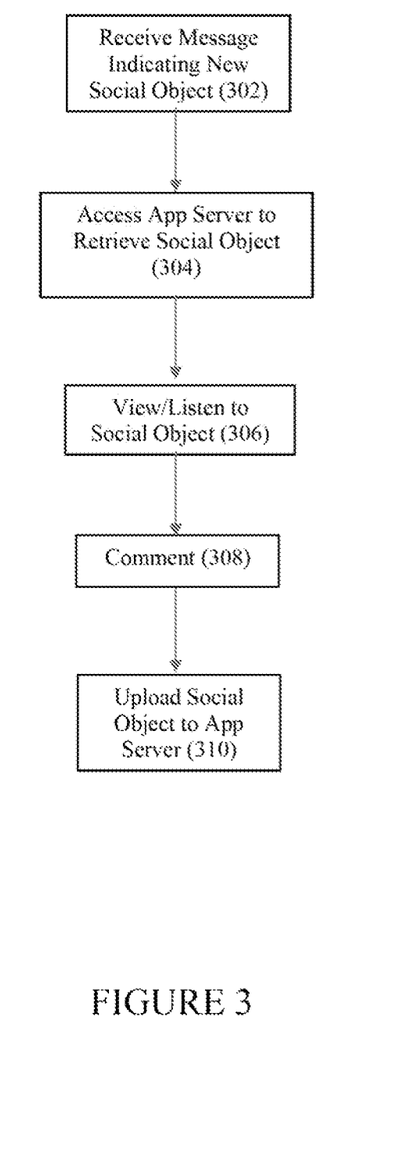
FIG. 3 representatively illustrates an operational flowchart for viewing received social objects in accordance with an exemplary embodiment of the present invention.

Referring now to FIG. 3, if the application server 108 receives a social object intended for delivery to another user, the application server 108 may then send a message to other user's computing device 114 that the social object has been created and is available for access (302). Upon receipt, the social object creation module 102 may display an indication to the user that the social object is available and upon the appropriate input from the user, the social object creation module 102 may access the application server 108 to retrieve the social object by having the social object transferred to the computing device (304). Once the social object has been delivered, the user may view the image and simultaneously listen to the audio file (306). The user may further have the option to access any additional associations or to save the social object. The social object creation module 102 may also be configured to allow the user to create a text or audio based comment that will be associated with the social object such that it may be shared with others (308). If the text or audio based comment is created, then the social object creation module 102 may update the social object to include the comment and transfer the updated social object to the application server 108 in a similar manner as for a newly created social object (310).

The social object creation module 102 may be installed onto the computing device 114 by any suitable method. For example, in one embodiment, the user may access the application delivery system 116 and select to have the social object creation module 102 downloaded and installed onto the computing device 114. In another embodiment, the user may access the application server 108 with the computing device 114 such as by visiting a web site or other similar portal. The user may then be prompted to create a new account or login to an existing account to gain access to the application server 108. Once logged in, the user may choose to have the social object creation module 102 installed to their computing device 114. This may then cause the computing device 114 to download a file suitably configured to add the social object creation module 102 to the available application software of the computing device 114.

The application server 108 may also be adapted to allow multiple users to interact with each other by allowing the users to share or view social objects. The users may be able to access the application server 108 via the social object creation module 102 and upload and share social objects. For example, in one embodiment, the user may be able to access the application server 108 directly with the computing device 114 by activating the social object creation module 102. In another embodiment, the user may be able to access the application server 108 without the social object creation module 102 by using a web browser to visit a web site communicatively linked to the application server 108. For example, the user may access a third party social network website and be able to access a social object that is displayed or posted on the third party website.

The users may be able to search the application server 108 and/or the social media network 112 for social objects created by others by any suitable method such as by category of interest, type of image, and/or names of users. The application server 108 may also be configured to allow users to interactively submit text or audio based comments on social objects presented by the application server 108 to users.

The particular implementations shown and described are illustrative of the invention and its best mode and are not intended to otherwise limit the scope of the present invention in any way. Indeed, for the sake of brevity, conventional manufacturing, connection, preparation, and other functional aspects of the system may not be described in detail. Furthermore, the connecting lines shown in the various figures are intended to represent exemplary functional relationships and/or steps between the various elements. Many alternative or additional functional relationships or physical connections may be present in a practical system.

In the foregoing specification, the invention has been described with reference to specific exemplary embodiments. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

As used herein, the terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

The invention claimed is:

1. A system for allowing a user to create a social object with a computing device having a memory device, comprising:
   a social object creation module coupled to the computing device and configured to enable the computing device to:
      receive an input from the user to associate a digital image with an audio file;
      receive an input from the user to identify the digital image and the audio file;
      create an electronic file association linking the digital image to the audio file to generate a social object;
      save the social object to the memory device; and
      transfer the saved social object in response to a command from the user.

2. A system for allowing a user to create a social object according to claim 1, further comprising an application server communicatively linked to the computing device and configured to:
   interact with the computing device over a communication network;
   receive the transferred social object from the computing device; and
   provide access to the transferred social object to a second computing device.

3. A system for allowing a user to create a social object according to claim 2, wherein the application server is further configured to:
   receive an input from the second computing device requesting access to the social object; and
   communicate the social object to the second computing device, wherein the second computing device is enabled to simultaneously:

display the digital image; and
play the audio recording.

4. A system for allowing a user to create a social object according to claim 3, wherein the social object is configured to require a security code entered from the second computing device prior to displaying the social object on the second computing device.

5. A system for allowing a user to create a social object according to claim 2, further comprising an application delivery system communicatively linked to the computing device and the application server, wherein the application delivery system is configured to communicate a set of programming instructions to the computing device.

6. A system for allowing a user to create a social object according to claim 1, wherein the social object creation module is configured to play the audio file in response to an input associated with a play command.

7. A system for allowing a user to create a social object according to claim 1, wherein the social object creation module is configured to link a text based caption to the social object in response to an input from the user.

8. A system for allowing a user to create a social object according to claim 1, wherein the social object creation module is configured to link a geographic location identifier to the social object in response to an input from the user.

9. A system for allowing a user to create a social object according to claim 1, wherein the social object creation module is configured to apply an audio filter to the audio file in response to an input from the user.

10. A system for allowing a user to create a social object according to claim 1, wherein the social object creation module is configured to apply an image filter to the digital in response to an input from the user.

11. A method for allowing a user to create a social object with a computing device, comprising:
 displaying a user interface of a social object creation module on a screen coupled to the computing device;
 receiving with the computing device a first series of inputs from the user to cause the computing device to identify:
  a digital image; and
  an audio file;
 receiving with the computing device a second series of inputs from the user comprising a command to cause the computing device to link the digital image with an audio file; and
 creating an electronic file association linking the digital image to the audio file to generate the social object.

12. A method according to claim 11, further comprising saving the social object to a memory device coupled to the computing device.

13. A method according to claim 1, wherein the command to identify the digital image comprises receiving an input from the user via the user interface to select the digital image from at least one of a memory device coupled to the computing device, an image capturing device coupled to the computing device, and a social media network.

14. A method according to claim 11, wherein the command to identify the audio file comprises receiving an input from the user via the user interface to select the audio file from at least one of a memory device coupled to the computing device, an audio recording device coupled to the computing device, and a social media network.

15. A method according to claim 11, further comprising receiving with the computing device a second command, wherein the second command comprises an instruction to cause the computing device to share the social object with a second computing device.

16. A method according to claim 15, wherein sharing the social object comprises transferring the social object to the second computing device by at least one of near field communication, short-wavelength radio transmission, and a communication system.

17. A method according to claim 15, wherein sharing the social object comprises:
 uploading the social object from the computing device to an application server; and
 downloading the social object from the application server to the computing device.

18. A method according to claim 17, further comprising:
 receiving an input at the application server from the second computing device requesting access to the social object;
 communicating the social object from the application server to the second computing device, wherein the second computing device is enabled to simultaneously:
  display the digital image; and
  play the audio recording.

19. A method according to claim 18, further comprising receiving a second input at the second computing device comprising a security code prior to opening the social object for display to the second computing device.

20. A method according to claim 18, further comprising:
 updating the social object to include:
  at least one of a text based comment and an audio based comment; and
  a desired recipient with the second computing device; and
 forwarding the updated social object to the desired recipient.

21. A method according to claim 11, wherein the audio file is played on the computing device in response to an input associated with a play command.

22. A method according to claim 11, further comprising:
 receiving with the computing device a third series of inputs from the user comprising a command to cause the computing device to receive a text based caption; and
 prompting the user to create the text based caption, wherein the social object creation module causes the computing device to:
  receive the text based caption; and
  include the text based caption in the electronic file association when generating the social object.

23. A method according to claim 11, further comprising:
 receiving with the computing device a third series of inputs from the user comprising a command to cause the computing device to receive a geographic location identifier; and
 prompting the user to enter the geographic location identifier, wherein the social object creation module causes the computing device to:
  capture the geographic location identifier; and
  include the geographic location identifier in the electronic file association when generating the social object.

24. A method according to claim 11, further comprising:
 receiving with the computing device a third series of inputs from the user comprising a command to cause the computing device to apply an audio filter to the social object; and
 prompting the user to select the audio filter, wherein the social object creation module causes the computing device to apply the selected audio filter to the audio file in the electronic file association when generating the social object.

25. A method according to claim 11, further comprising:
receiving with the computing device a third series of inputs from the user comprising a command to cause the computing device to apply an image filter to the social object; and
prompting the user to select the image filter, wherein the social object creation module causes the computing device to apply the selected image filter to the digital image in the electronic file association when generating the social object.

26. A method according to claim 11, further comprising:
receiving with the computing device a third series of inputs from the user comprising a command to cause the computing device to apply a privacy setting to the social object; and
causing the social object creation module to apply the privacy setting when generating the social object, wherein the privacy setting causes the social object to be deleted a predetermined time after being accessed by a second computing device.

* * * * *